US005664664A

United States Patent [19]

Gaines

[11] Patent Number: 5,664,664
[45] Date of Patent: Sep. 9, 1997

[54] MAGNETIC VIBRATOR SUB-ASSEMBLY FOR VIBRATORY FEED DEVICES

[75] Inventor: Jefferson J. Gaines, Tucson, Ariz.

[73] Assignee: U.S. Vibra, Inc., Tucson, Ariz.

[21] Appl. No.: 365,342

[22] Filed: Dec. 28, 1994

[51] Int. Cl.$^6$ ................................................. B65G 27/24
[52] U.S. Cl. .................................................. 198/769
[58] Field of Search ................................. 198/763, 769, 198/771

[56] References Cited

U.S. PATENT DOCUMENTS

| | | |
|---|---|---|
| 2,098,034 | 11/1937 | Flint et al. ............................ 198/769 X |
| 2,746,598 | 5/1956 | Sherwen ................................. 198/769 |
| 3,627,112 | 12/1971 | Smith ..................................... 198/769 |
| 3,786,912 | 1/1974 | Taylor .................................... 198/769 |
| 4,275,978 | 6/1981 | Brooks et al. ....................... 198/763 X |
| 4,378,064 | 3/1983 | Brown .................................... 198/769 |
| 4,633,995 | 1/1987 | Hamada ............................... 198/763 X |
| 5,184,716 | 2/1993 | Gaines .................................... 198/763 |
| 5,285,890 | 2/1994 | Stearns ................................. 198/763 X |

*Primary Examiner*—David A. Bucci
*Attorney, Agent, or Firm*—Richard R. Mybeck; Peter B. Scull

[57] ABSTRACT

A magnetic vibrator sub-assembly for a vibratory feed device is described which provides uniform directional motion to component parts placed on its upper member through coaction of the upper member with an alternately energized electromagnetic field and restorative spring forces. The structure of the present invention involves the interconnection of a lower member and an upper member by one or more flat springs. The flat springs are angularly disposed between and support the upper member in superposed spaced, generally parallel relationship above the lower member. The springs are connected to both the lower and upper members in rabbet-type indentations such that the springs are confined by retaining barriers above, below and on the lateral edges of the springs. An electromagnetic coil is attached to the lower member and is employed to alternately flex and release the flat springs by alternately magnetically attracting (i.e., pulling down) and releasing the upper member. This action imparts a forward-only impulse motion on the component parts delivered to and placed on the upper member. The forward-only motion eventually propels the component parts to the desired pick point in proper orientation for pickup by automated or robotic pick and place machinery coacting therewith in an electronics assembly application.

9 Claims, 2 Drawing Sheets

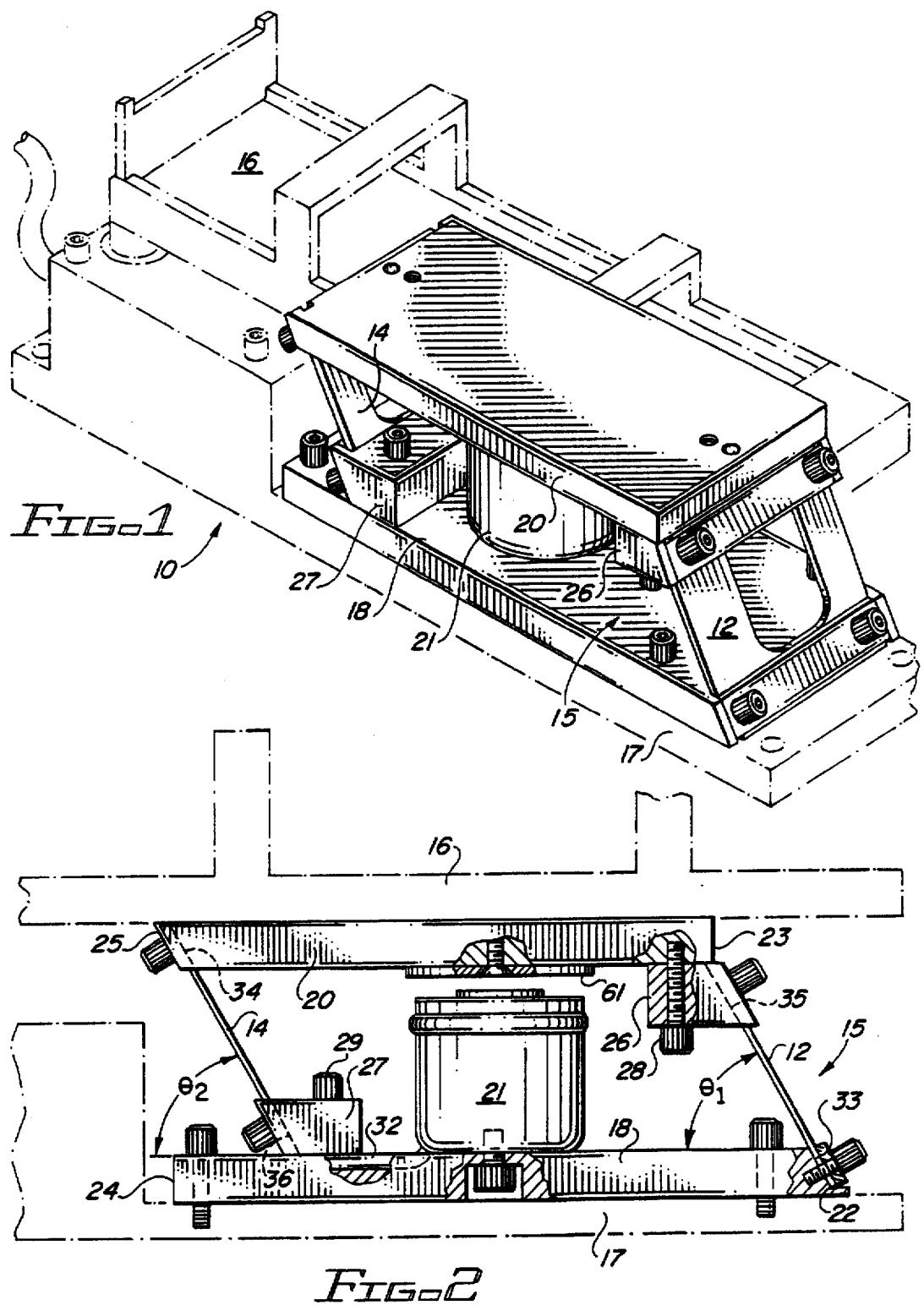

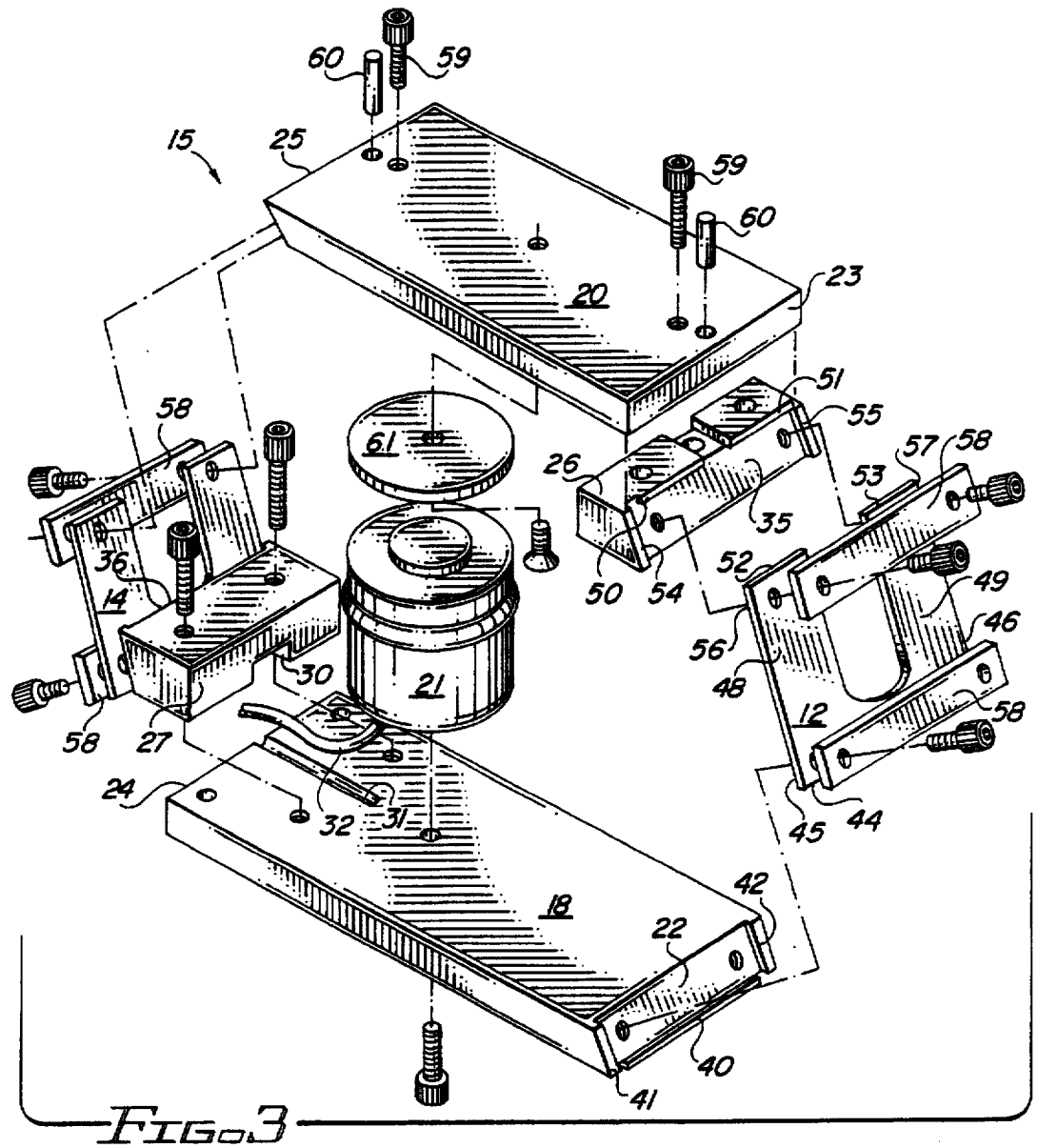

MAGNETIC VIBRATOR SUB-ASSEMBLY FOR VIBRATORY FEED DEVICES

INTRODUCTION

The present invention relates generally to an improved delivery assistance device and more particularly to a magnetic vibrator sub-assembly for vibratory feed devices that has fixed flat springs for use in surface mount electronic assembly applications.

BACKGROUND OF THE INVENTION

The continued miniaturization of electronic components for use in electronic devices has given rise to a need for self-contained component feeder assembly units which are ready to mount into an existing work envelope for use with pick and place robotics machinery whenever and wherever reliable component parts delivery is required. In particular, electronic component feed devices used in the robotic assembly of integrated circuit boards and like electronics applications must provide steady and dependable delivery of parts to a given work site. Furthermore, it is extremely important that each part be correctly oriented and strategically aligned so that it can be properly interfaced with other systems including pick and place machinery and like robotics to ensure that each part is where it should be when it should be and is oriented as it should be so that an efficient production line can be maintained. It is for these reasons that existing vibratory feeders were designed.

However, some of the major problems with existing vibratory feed devices are the frequent misorientation or misalignment of critical parts and the frequent and expensive downtime required to change dedicated vibratory feeder platforms when switching from the delivery of one type of circuit board component to a different type of component for continued assembly of the same or a different circuit board. The different or substitute components are usually of different sizes and shapes and thus, the prior art uses dedicated platforms which are generally made to accommodate only a limited quantity of sizes and shapes of component parts. Therefore, the time lost to production includes both the manual switching of dedicated platforms as well as the programming adjustment of the X and Y coordinates of the automated pick and place or robotic machinery to properly locate and pick up the newly selected different component parts.

Accordingly, a serious need exists in industrial electronics assembly lines and particularly with integrated circuit chip applications for a new and improved vibratory parts delivery device, which saves time and money while increasing productivity and enhancing the reliability and dependability of such machines and thereby enables them to contribute more to the overall efficiency of the assembly production line.

It has been found, and will hereinafter appear in greater detail, that the sub-assembly of the present invention not only solves the prior art problems but provides a reliability and precision heretofore unobtainable by prior art devices.

BRIEF SUMMARY OF THE INVENTION

The present invention involves a unique magnetic vibrator sub-assembly for a vibratory feed device that has flat springs interposed in a fixed position between the lower and upper members of the sub-assembly to provide increased stability and remove the need for incremental spring adjustments. Thus, the present invention provides for fast, efficient exchange of interchangeable top platforms to be affixed to a semipermanent upper member of the present invention without disturbing the three-dimensional, X, Y or Z location settings for the component parts presented by the vibratory feed device to the automatic or robotic pick and place machinery. More particularly, the present invention provides an improved in-line, vibratory feed device having fixed position flat springs which enable delivery of small component parts such as those used in electronic assembly operations while also providing a high pick point accuracy in delivery that is completely repeatable not only from part to part in a single operation, but also from one assembly operation to another involving different parts and different, interchangeable top platforms.

The novel structure of the present invention involves the interconnection of a lower member and an upper member of the vibratory sub-assembly by a pair of flat springs operatively interposed therebetween. The flat springs are angularly disposed between and support the upper member in spaced, generally parallel superposed relationship above the lower member. The springs are connected to both the lower and upper members in rabbet-type indentations such that the springs are confined by retaining barriers abutting the top, bottom and lateral edges of the springs. Furthermore, as described generally in my previous patent (U.S. Pat. No. 5,184,716) which involved cylindrical springs, an electromagnetic coil is similarly attached to the lower member of the sub-assembly of the present invention to alternately flex and release the flat springs of this sub-assembly. Thus, the coil, which cycles between creating a magnetic attraction force and then presenting no attraction force, alternately magnetically attracts the upper member (i.e. pulls it downward) and then releases it to allow the springs to return the upper member upward to its normal position. This action imparts a forward-only impulse motion to the component parts placed on the upper member or a top platform attached thereto. The forward only motion eventually propels the component parts to the preselected pick point in proper orientation for pick up by the automated or robotic pick and place machinery.

Accordingly, a principal object of the present invention is to provide a new and improved magnetic vibrator sub-assembly for a vibratory feed device for electronic component parts which has improved reliability in the delivery and orientation of the parts transported thereby.

Another object of the present invention is to provide an improved vibrator sub-assembly having flat springs attached to and interposed between the lower and upper members of a vibrator sub-assembly to increase stability and accuracy in the delivery of small component parts for electronic assembly operations.

These and still further objects as shall hereinafter appear are readily fulfilled by the present invention in a remarkably unexpected manner as will be readily discerned from the following detailed description of an exemplary embodiment thereof especially when read in conjunction with the accompanying drawings in which like parts bear like numerals throughout the several views.

BRIEF DESCRIPTION OF THE DRAWINGS

In the drawings:

FIG. 1 is an isometric view of a vibratory feed device having a magnetic vibrator sub-assembly embodying the present invention operatively associated therewith;

FIG. 2 is a side elevation of the magnetic vibrator sub-assembly of FIG. 1; and

FIG. 3 is an exploded isometric view of the magnetic vibrator sub-assembly shown in FIGS. 1 and 2,

DESCRIPTION OF THE PREFERRED EMBODIMENT

Referring now to the attached drawings, a description of the preferred embodiment of the present invention, its assembly and operation will now be presented.

The present invention relates generally to in-line vibratory feed devices, an example of which is identified in FIG. 1 by the general reference numeral 10. This invention more particularly involves the mounting and orientation of first and second springs 12 and 14 on magnetic vibrator sub-assembly 15 so as to ensure stability and accurate, repeatable three-dimensional positioning of a top platform 16 which is mounted on sub-assembly 15.

FIG. 1 shows a magnetic vibrator sub-assembly 15 having a top platform 16 (shown in dashed lines) attached thereto. Sub-assembly 15 is also attached to a base 17 (also shown in dashed lines). A complete vibratory feed device 10 generally comprises a base 17, a sub-assembly 15 and a top platform 16. Top platform 16 is preferably adjustably configurable to receive a wide variety of component parts (not shown) which are to be delivered to automatic or robotic pick and place machinery (also not shown). Base 17 is used to mount the present invention in a preselected assembly line location.

Sub-assembly 15 has a lower member 18 to which are attached (either directly or indirectly) springs 12 and 14 which, in turn, support an upper member 20. A vibratory electromagnetic coil assembly 21 is also mounted upon lower member 18 as shown in FIGS. 1 and 2. The coaction of springs 12 and 14 with coil assembly 21 to move component parts will be described further below.

As shown most clearly in FIG. 2, spring 12 is attached directly to front end 22 of lower member 18 and supports leading end 23 of upper member 20. Similarly, spring 14 is disposed on lower member 18 near its rear end 24 and is also attached directly to and thereby supports trailing end 25 of upper member 20. Also as shown in FIG. 2, it is preferable for springs 12 and 14 to be attached at certain predetermined interior angles $\Theta_1$ and $\Theta_2$ measured between the substantially horizontal plane of lower member 18 and the planes of springs 12 and 14. Note, $\Theta_1$ and $\Theta_2$ may but need not be equal and measure from about 5° to 85°.

In one practice of the present invention, springs 12 and 14 may be connected directly to ends 22, 23 and 24, 25 of lower and upper members 18 and 20, respectively, although in the preferred embodiment, as shown in FIGS. 1-3, the mounting of springs 12, 14 involves the use of two substantially rectangular blocks, herein referred to as first and second spring banks 26 and 27, respectively. Spring banks 26, 27 are used to attach springs 12 and 14 to lower and upper members 18 and 20. More specifically, spring bank 26 is attached directly to and depends from upper member 20 by suitable fastening means 28 while spring bank 27 is attached to lower member 18 by suitable fastening means 29 such as screws, bolts and the like. As shown in FIG. 3, a channel 30 is formed on the lower surface of spring bank 27 while a corresponding groove 31 is formed on lower member 18 in registry with channel 30. Channel 30 and groove 31 coact to receive and contain power cable 32 which extends from coil assembly 21 to a suitable power source (not shown).

As mentioned above, springs 12 and 14 are mounted at preselected angles $\Theta_1$ and $\Theta_2$ which, as shown in FIG. 2, are established and maintained by the coaction of the slanted connection edges at or near the front and rear edges of lower and upper members 18 and 20. As shown in FIGS. 1-3, two of these slanted connection edges; front edge 33 located on front end 22 of lower member 18 and edge 34 on trailing end 25 of upper member 20 are each formed directly on lower and upper members 18 and 20, respectively. The other two connection edges 35 and 36 are formed on spring banks 26 and 27, respectively.

The slanted connection edges are formed substantially as shown having preselected interior acute angles corresponding to angles $\Theta_1$ and $\Theta_2$. Again, $\Theta_1$ and $\Theta_2$ may but need not be equal and generally measure from about 5° to 85°. Also as shown, it is preferable to have springs 12 and 14 slanted such that the top ends of springs 12 and 14 are disposed above and rearward relative to the lower ends thereof.

The preferred embodiment of sub-assembly 15 also has rabbet-type indentations formed in the slanted connection edges associated with lower and upper members 18 and 20. These indentations, in coaction with multiple protruding barriers, provide greater accuracy and stability in positioning springs 12 and 14 for interconnecting lower and upper members 18 and 20 for repeatable, consistent and steady in-line operation of feeder device 10. It is preferable, as shown in the attached drawings, that these indentations be formed in spring banks 26, 27, and lower and upper members 18 and 20 leaving several protruding retaining barriers as described below. In particular, and as is most clearly shown in FIG. 3, lower member 18 has a front end slanted connection edge 33 which is indented relative to a protruding lower retaining barrier 40 and two protruding side barriers 41 and 42. Side barriers 41 and 42 are oriented substantially parallel to each other on opposite lateral sides of lower member 18. They are also generally perpendicular to lower retaining barrier 40. Thus, when mounted on connection edge 33, the lower, substantially squared end of flat spring 12 abuts against retaining barriers 40-42 with its bottom edge 44 abutting against barrier 40 and first and second lower lateral edges 45, 46 abutting against lateral side barriers 41 and 42, respectively. In this way, spring 12 is made more stable as mounted so that there can be no possible undesirable unsteady, side to side or rotating motion. Further, when removal and reattachment or replacements of the springs or other structural members are necessary, retaining barriers 40-42 assist in accurately repositioning spring 12 to its original three-dimensional spatial location so that the pick and place machinery cooperatively coacting with vibratory feed device 10 will not have to be readjusted to conform to a new pick point location.

Similar retaining barriers are formed directly on spring bank 26 to define a similar rabbet-type indentation as again is most clearly shown in FIG. 3. This indentation supports the upper substantially squared ends of first and second arms 48 and 49 of spring 12 such that two top retaining barriers 50 and 51 abut against upper edges 52 and 53 of first and second arms 48, 49 of spring 12. Meanwhile, first and second side retaining barriers 54 and 55, which are generally perpendicular to top retaining barriers 50 and 51, abut against and thereby secure first and second upper lateral edges 56, 57 of spring 12. Thus, spring 12 is confined within the rabbet-type indentation on spring bank 26 and thereby secured to upper member 20 such that spring 12 cannot move upwards or laterally relative to upper member 20.

A similar arrangement of rabbet-type indentations is used on trailing end 25 of upper member 20 and on spring bank 27 to rigidly secure spring 14 to both upper member 20 and lower member 18. Thus, spring 14 is also made stable with no undesirable unsteady, side to side or rotational motion.

As described above, lower and upper members 18 and 20 are operatively connected to each other by flat springs 12 and 14. The upper, lower and lateral sides of each spring are substantially squared or rectangularly shaped while each spring has a "U"-shaped cut out from the upper edge to a spaced relationship with the lower edge. Thus, each spring in the preferred embodiment has two arms, (such as arms 48 and 49 of spring 12) the tops of which are attached to the slanted connection edges of upper member 20. Similarly, the springs are mounted at their lower ends to the slanted connection edges of lower member 18. Springs 12 and 14 are mounted such that they fit securely into the rabbet-type indentations on the corresponding slanted edges. Screws, bolts or like attachment means may be used to secure these connections. Preferably, one or more cover members 58 are used to further secure these spring connections.

In operation of a vibratory feed device 10, a top platform 16 is attached to upper member 20 while lower member 18 is attached to a base 17. Top platform 16 is capable of receiving small component parts of the type used in the manufacture and assembly of electronic circuit boards particularly as such parts are to be picked up and maneuvered by automated or robotic assembly pick and place machinery (not shown). Top platform 16 is attached directly to upper member 20 as described above by any of several conventional methods including the use of screws or bolts 59 as shown in FIG. 3. Dowel pins 60 are also used for the attachment of top platform 16 to upper member 20 and are inserted into corresponding holes in both upper member 20 and top platform Dowel pins 60 assist in securely and properly aligning top platform 16 during the installation of screws or bolts 59 while also being useful to absorb vibrational stresses occurring during the vibrational operation of device 10. Otherwise, these stresses would be absorbed solely by the screws or bolts 59 and thereby cause an undesirable loosening or failure thereof.

When sub-assembly 15 is attached to and between top platform 16 and base 17 in the manner described, a vibratory feed device 10 is assembled. Device 10 may then be demountably mounted in a predetermined work space in cooperative association with existing robotic pick and place machinery as generally described above. As is generally known in the art, one or more anti-static tubes or other delivery means (not shown) may then be disposed on top platform 16 relative to one or more guide lanes and elevator braces (neither shown) which are attached to top platform 16. An example of a similar arrangement is set forth in my previous patent, U.S. Pat. No. 5,184,716. More specifically, the anti-static tube(s) (or other delivery means) are held in position by one or more elevator and/or hold down braces which are adjustably attached to top platform 16 to deliver a supply of component parts passed through said anti-static tube(s) to predetermined pick points in said one or more guide lanes.

In use, device 10 operates by supplying electric power to coil assembly 21 which alternately energizes and de-energizes a magnetic field that alternately attracts and releases upper member 20. An armature plate 61 may optionally be attached to the undersurface of upper member 20 immediately above coil assembly 21 to focus the magnetic attraction and release action described above. The force of the magnetic attraction causes upper member 20 to move vertically downward and, due to the angled orientation of springs 12 and 14, slightly rearwardly toward rear end 24 of lower member 18. Springs 12 and 14 are forced or flexed against their normally biased position during this attraction motion. During the de-energizing part of the alternating power cycle as applied by coil assembly 21, the electromagnetic attraction is switched off and upper member 20 is released from this downward pull. Flexed springs 12 and 14 are thus allowed to respond by returning to their normally biased, unforced position and thus provide the impetus required to return upper member 20 to its original uninfluenced position. Each movement has a preferably small amplitude, and is controllable to provide a variety of consistent amplitudes and frequencies. Continuous and rapid repetition of this alternating motion imparts a vibrational linear motion to upper member 20 and thus also to top platform 16, thereby moving any component parts placed thereon linearly in the desired direction, preferably from rear to front, to eventually place them at the proper pick point of the associated guide lane on top platform 16 so that the component parts are where they can each be picked up by the aforementioned automated or robotic pick and place machinery. The stability and accuracy provided by the spring positioning in the rabbet-type indentations generates a greater reliability and consistency in delivery of the aforementioned small component parts to the proper pick point interface with manufacturing and assembly pick and place machinery.

Note, it is foreseeable that upper member 20 could be integrally formed with top platform 16 in one inseparable piece such that the functions of each are met by a single member. Similarly, lower member be could be integrally formed with base 17 such that they, too, are inseparable. Thus, a sub-assembly 15 comprising such member would be coextensive with and would identically embody vibratory feed device 10 without a detachable base 17 or top platform 16.

It is, of course, also foreseeable that a wide variety of combinations of spring connections using either fewer or more spring blocks may be used with the present invention and are thus intended to be included within the scope of this disclosure. More specifically, any number of spring blocks are foreseeably usable in different embodiments including for example, no blocks where the springs are attached directly to the front and rear ends of the upper and lower members.

From the foregoing, it is readily apparent that a new and useful embodiment of the present invention has been herein described and illustrated which fulfills all of the aforestated objects in a remarkably unexpected fashion. It is of course understood that such modifications, alterations and adaptations as may readily occur to the artisan confronted with this disclosure are intended within the spirit of this disclosure which is limited only by the scope of the claims appended hereto.

Accordingly, what is claimed is:

1. A vibratory feed device for linear delivery of small component parts comprising: a lower member having an upper surface, a vibratory electromagnetic coil assembly mounted upon said upper surface of said lower member; an upper member being disposed in spaced, generally parallel relationship above said lower member and said coil assembly, said upper member being adapted to receive and support a plurality of small component parts thereon; one or more flat spring means operatively interposed between and attached to said lower member and said upper member to support said upper member, each said flat spring means having a pair of opposing lateral edges, a lower end with a bottom edge, and one or more arms integrally connected to said lower end wherein each said arm has an upper end with a top edge such that each said arm is attached at said upper end thereof to said upper member and wherein said lower end of said flat spring means is attached to said lower member; and power means operatively associated with said vibratory electromagnetic coil assembly and selectively actuatable in coaction with said flat spring means to impart linear forward-only motion to said small component parts when disposed upon said upper member.

2. A vibratory feed device according to claim 1 in which said lower member has a front end and a rear end and said front end and said rear end each have one or more rabbet-type indentations operatively formed therein; and further in which said upper member has a leading end and a trailing end and said leading end and said trailing end each have one or more rabbet-type indentations operatively formed therein; and in which each of said flat spring means are attached to said lower and upper members such that each said upper end of each said arm is secured in a corresponding one of said rabbet-type indentations of said upper member and each said lower end of each said spring means is secured in a corresponding one of said rabbet-type indentations of said lower member.

3. A vibratory feed device according to claim 2 in which at least one of said flat spring means is attached to at least one of said one or more rabbet-type indentations operatively formed on said front end of said lower member, and to at least one of said one or more rabbet-type indentations operatively formed on said leading end of said upper member.

4. A vibratory feed device according to claim 2 in which at least one of said flat spring means is attached to at least one of said one or more rabbet-type indentations operatively formed on said rear end of said lower member, and to at least one of said one or more rabbet-type indentations operatively formed on said trailing end of said upper member.

5. A vibratory feed device according to claim 2 in which said upper member has a lower surface and said one or more rabbet-type indentations operatively formed on said leading end of said upper member are on a first substantially rectangular spring bank which is attached to and depends from said lower surface of said upper member; and said one or more rabbet-type indentations operatively formed on said rear end of said lower member are on a second substantially rectangular spring bank which is affixed to and stands upon said upper surface of said lower member.

6. A vibratory feed device according to claim 2 in which each of said one or more rabbet-type indentations operatively formed on said front end and said rear end of said lower member has retaining barriers abutting said bottom edge and each of said pair of opposing lateral edges of said one or more flat spring means which are attached thereto.

7. A vibratory feed device according to claim 2 in which each of said one or more rabbet-type indentations operatively formed on said leading end and said trailing end of said upper member has retaining barriers abutting said upper edges of said one or more arms and each of said pair of opposing lateral edges of said flat spring means which are attached thereto.

8. A vibratory feed device according to claim 1 in which said upper member has an upper surface and said feed device further comprises a top platform attached to said upper surface of said upper member.

9. A vibratory feed device according to claim 1 which further comprises a base to which said lower member is attached.

* * * * *